United States Patent
Randall et al.

[11] 3,870,399
[45] Mar. 11, 1975

[54] PSEUDO-FIBER OPTIC DEVICES
[75] Inventors: Lyman J. Randall; Thomas P. Seward, III, both of Corning, N.Y.
[73] Assignee: Corning Glass Works, Corning, N.Y.
[22] Filed: Nov. 28, 1973
[21] Appl. No.: 419,594

[52] U.S. Cl. ............................ 350/96 B, 65/3, 65/4, 65/DIG. 7, 65/30
[51] Int. Cl. ............................................. G02b 5/14
[58] Field of Search ........ 350/96 B; 65/3, 4, DIG. 7, 65/30

[56] References Cited
UNITED STATES PATENTS
2,319,816  5/1943  Land ...................................... 65/33

*Primary Examiner*—Eli Lieberman
*Attorney, Agent, or Firm*—Kees van der Sterre; Clarence R. Patty, Jr.

[57] ABSTRACT

Unitary phase-separated glass demonstrating the behavior of bundled fiber-optic devices are described. Phase-separable glasses of appropriate composition are treated to induce separation into a high-refractive-index glass matrix and uniformly dispersed low-index droplets, and the glass is then severely elongated to transform the droplets into parallel, needle-shaped, low-index particles. Light striking the glass within a defined acceptance angle is channeled through the matrix by successive reflections from the particles and emitted to form a coherent image of the source.

6 Claims, 4 Drawing Figures

PATENTED MAR 11 1975                            3,870,399

PSEUDO-FIBER OPTIC DEVICES

BACKGROUND OF THE INVENTION

Fiber optics is a branch of optical technology which makes use of the phenomenon of total internal reflection to transmit light through an optically transparent fiber. A suitable fiber consists of a clear glass or plastic of high refractive index relative to that of the surrounding medium which may be air, liquid, or a cladding layer such as a different plastic or glass. Such a fiber traps light within a defined acceptance angle ($\theta$) and, because of total internal reflection, transmits the light down the fiber to be emitted from the output end at the same angle with respect to the axis of the fiber as it entered. The light is not transmitted through the walls of the fiber as long as the angle of incidence on the reflecting walls is greater than the critical angle ($\alpha$) necessary for total internal reflection. The value of the critical reflection angle ($\alpha$) depends on the refractive indices of the core and cladding as follows:

$$\sin \alpha = n_2/n_1$$

wherein $n_1$ is the refractive index of the fiber and $n_2$ is the refractive index of the cladding.

The angle of acceptance ($\theta$) within which the fiber will trap and transmit light depends on the value of the critical reflection angle ($\alpha$) as well as on the refractive index of the surrounding medium, as follows:

$$\sin \theta = n_1/n_0 \sqrt{1 - \sin^2 \alpha} = n_1/n_0 \sqrt{1 - [n_2/n_1]^2}$$

wherein $n_0$ is the refractive index of the surrounding medium (with air this value is 1), $n_1$ is the refractive index of the fiber core, and $n_2$ is the refractive index of the fiber cladding. The relationship between these angles and the axis and walls of a conventional fiber optic is depicted in FIG. 2 of the drawing.

The mechanics and theoretical considerations involved in the field of fiber optics have been reviewed extensively in the literature. One well-recognized discussion one be found in Appendix N of the book "Concepts of Classical Optics" by John Strong, published in 1958.

Fiber optics are commonly used in the art in combination with other fibers to provide flexible fiber bundles useful as light pipes in many applications. The ability of individual glass-clad glass fibers to be stacked and redrawn into rigid coherent bundles capable of transmitting a high quality optical image has led to the fabrication of complex devices such as fiber optic face plates, image magnifiers, intensifiers, rotators and dissectors.

In general, since each fiber in such a device acts to transmit light from a single point source, the resolving power thereof is dependent on the number of fibers per unit of bundle cross-sectional area. Hence, the larger the number of fibers per unit area, the greater the image resolution at the exit end of the device. It is readily apparent, however, that the manufacture of coherent fiber optic devices by the successive stacking and redrawing of large numbers of clad glass fibers is quite expensive. It would, therefore, be desirable to provide means of producing coherent fiber optic devices which do not require the manufacture of numerous small components and the fabrication of those components into a complex glass article.

SUMMARY OF THE INVENTION

We have discovered that fiber optic behavior may be induced in phase-separated glass articles by controlling the nature and configuration of the separated phase. More specifically, we have found that if a phase-separated glass containing second phase droplets of refractive index less than that of the matrix glass is severely elongated, as by stretching at a temperature near the softening point of the glass, so that the second phase droplets are elongated into low-index, needle-shaped particles oriented in the direction of elongation of the glass, the stretched phase-separated glass will demonstrate fiber optic-like behavior. This behavior is evidenced by the fact that the glass will transmit light along its stretch or elongation axis (the direction of particle elongation) from one end of the glass to the other, and will emit the light at the same angle with respect to the elongation axis as it entered.

The advantages of such a material are that it can be made from a single glass composition and requires only a single drawing step to produce the desired effect. Also, unlike bundled fiber devices, a pseudo-fiber optic device such as described has no continuous interface from one end to the other and is, therefore, inherently hermetic. In addition, such a device contains no visibly resolvable cores or claddings.

The mode of operation of a pseudo-fiber optic device such as above described is depicted in FIG. 1 of the DRAWING, wherein a LIGHT RAY entering the MATRIX GLASS is reflected along the ELONGATION AXIS of the device by successive reflections within the channels between the SEPARATED PHASE in the form of needle-shaped particles. Surprisingly, the light-channeling effect does not require continuity in the SEPARATED PHASE.

FIG. 2, in contrast, depicts a conventional fiber optic wherein the LIGHT RAY is channeled down the FIBER CORE by successive reflections from a continuous CLADDING.

Figure 1:
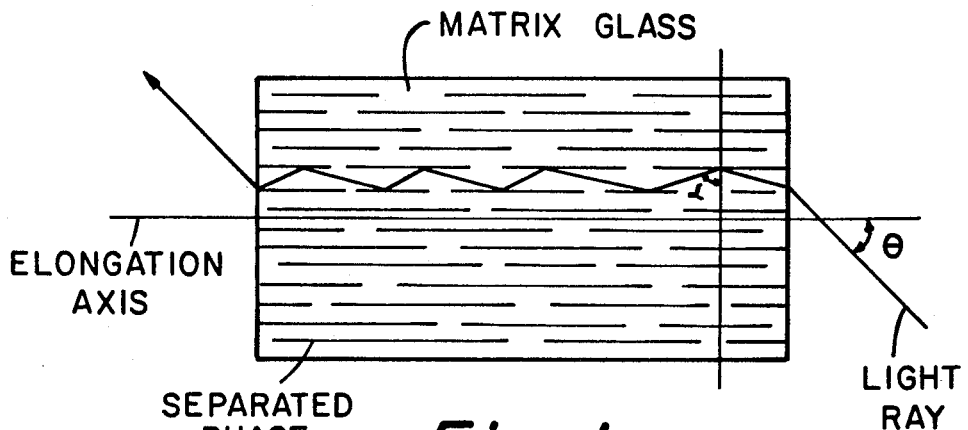
Figure 2:
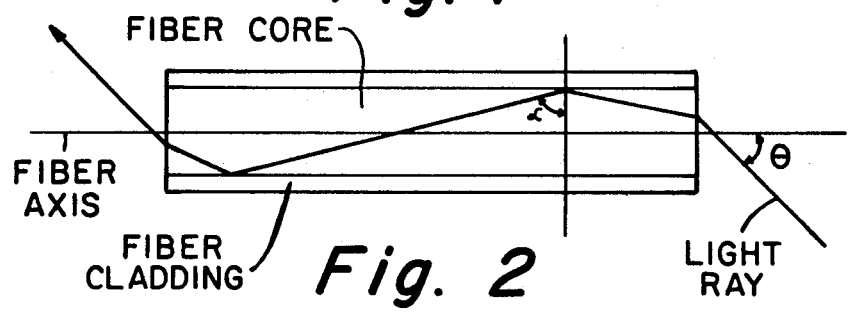

The present invention includes not only a phase-separated glass body having the described physical characteristics such that it will demonstrate fiber optic behavior, but also the use of that body as a pseudo-fiber optic device. By pseudo-fiber optic device is meant a phase-separated glass article of the described configuration exhibiting the light-transmitting behavior of bundled fiber optics. Useful pseudo-fiber optic devices include face plates, light pipes, image magnifiers, intensifiers, rotators, and dissectors.

The invention further includes a process for making a pseudo-fiber optic device which comprises preparing a glass demonstrating appropriate phase separation behavior and the required second phase characteristics, treating the glass to obtain controlled separation of the second phase, and stretching the phase-separated glass at a temperature in its working range to obtain the desired elongation and orientation of the second phase.

The optical behavior of a phase-separated glass article produced as described appears to be characterized by the same relationships which characterize the behavior of conventional fiber optics. Light which enters the phase-separated glass at angles within a defined acceptance angle ($\theta$) such that it strikes the elongated second phase particles in the glass at angles greater than or equal to the critical reflection angle ($\alpha$) is channeled through the matrix glass by successive reflections from the elongated second phase particles. The defined acceptance angle ($\theta$) is an angle between the direction of the entering light and the stretch or elongation axis of the glass. The elongation axis of the glass corresponds to the direction in which the glass has been stretched or otherwise deformed, and is indicated at any point in the glass by the elongated second phase particles which are parallel thereto. The elongation axis need not be uniform throughout the material, since the glass may be twisted or nonuniformly deformed to produce image rotation, magnification, dissection, and the like.

As is the case with conventional fiber optics, the angles ($\alpha$) and ($\theta$) appear to be defined by the refractive indices of the phases in the device and the surrounding medium. Hence, light impinging on the glass within the acceptance angle ($\theta$) as defined by:

$$\sin \theta = n_1/n_0 \sqrt{1 - [n_2/n_1]^2}$$

wherein $n_0$ is the refractive index of the medium surrounding the glass, $n_1$ is the refractive index of the continuous light-transmitting matrix phase, and $n_2$ is the refractive index of the particulate light-reflecting second phase, will be largely trapped, transmitted through the glass, and emitted to produce a coherent image in the manner demonstrated by bundled fibers.

DETAILED DESCRIPTION

The selection of glass compositions suitable for use in pseudo-fiber optics according to the invention requires a consideration of several factors. One of the most important is the phase separation behavior of the glass. Many silicate, borate, borosilicate, aluminosilicate, aluminoborate and aluminoborosilicate glass systems show some glass-in-glass phase separation behavior and may be considered potentially useful for the manufacture of pseudo-fiber optic devices. However, in order to precipitate the discrete low-index second phase particles in a controllable manner, the glass should exhibit single liquid stablity at some temperature in the range suitable for melting glasses (1,000°–2,000° C.), and should exhibit stable or metastable liquid-liquid immiscibility (i.e., form a two-phase melt) at some lower temperature in a range where the viscosity of the melt is such that the growth of the second phase occurs at a useful yet controllable rate. By stable liquid-liquid immiscibility is meant a state wherein the two-phase melt is stable against crystallization for an indefinite period. A metastable two-phase melt, on the other hand, may show devitrification with time. Preferably, phase separation should occur over a fairly broad temperature range to provide flexibility for the second phase growth process.

It is also desirable to select a composition system wherein second phase miscibility does not depend strongly on the composition of the batch. In some systems, miscibility may vary so strongly with composition that a minor composition change takes the glass from a composition which will not separate at any temperature to one which forms two liquid layers in a crucible at normal batch melting temperatures. Such compositions must be considered impractical for the present purposes.

From the forming standpoint, it is desirable that the viscosity of the glass in at least a portion of the temperature range of two liquid stability fall within a useful working range for the glass, so that the second phase particles will not tend to go back into solution in the course of the elongation process. The useful working range for the purposes of the present invention is considered to be about $10^4$–$10^{10}$ poises.

Finally, it is preferable that the viscosity of the separated second phase be less than or equal to the viscosity of the matrix glass at temperatures in the working range of the glass. Although particle elongation may occur even where the viscosity of the separated phase is higher than that of the matrix, particle elongation is greatly simplified where the viscosity of the separated phase is low, and superior second phase configuration is then obtained.

It is possible in some systems that the second phase particles may crystallize upon cooling to room temperature after elongation. However, the glass would still demonstrate fiber optic behavior provided the refractive index of the elongated phase is less than that of the light-transmitting matrix. Also, it appears that the greater the difference in refractive index between the matrix and the elongated second phase, the greater the acceptance angle at which the glass will trap and transmit light. Hence, although the relationship $$\sin \theta = n_1/n_0 \sqrt{1 - [n_1/n_2]^2}$$

as hereinabove set forth has not been quantitatively confirmed for pseudo-fiber optic systems because of the difficulty of accurately determining the refractive index of the elongated second phase particles, it is believed that this relationship does in fact describe the optical transmission process in pseudo-fiber optic devices.

The numerical aperture (NA) of a fiber optic device, which depends on the refractive indices of the light-transmitting and light-reflecting phases according to the relationship:

$$NA = \sqrt{n_1^2 - n_2^2}$$

is a measure of the light-gathering power of the device and is useful for comparing the efficiencies of fiber optic systems. Table I below lists binary silicate and borate glass composition systems, specific phase-separable compositions in those systems, the refractive index of the continuous light-transmitting matrix phase ($n_1$) obtainable for each composition, and the calculated numerical aperture obtainable for each composition in a phase-separated device, based on the assumption that the refractive index of the discontinuous elongated light-reflecting phase ($n_2$) which would separate from each composition approximates that of the network forming oxide (1.46 for both silica and $B_2O_3$ at the sodium D line). The specific compositions selected are near the modifier-rich end of the range of phase-separable glass compositions where the refractive index of the bulk glass (which corresponds to the matrix in the system) is greater.

TABLE I

| Composition System | Modifier Concentration (wt. %) | | Index of Matrix ($n_1$) | Numerical Aperture (NA) |
|---|---|---|---|---|
| CaO-SiO$_2$ | 37.3% | CaO | 1.59 | 0.65 |
| SrO-SiO$_2$ | 46.2% | SrO | 1.58 | 0.61 |
| BaO-SiO$_2$ | 45.0% | BaO | 1.57 | 0.59 |
| Li$_2$O-SiO$_2$ | 17.7% | Li$_2$O | 1.53 | 0.48 |
| Na$_2$O-SiO$_2$ | 24.8% | Na$_2$O | 1.50 | 0.39 |
| La$_2$O$_3$-B$_2$O$_3$ | 55% | La$_2$O$_3$ | 1.72 | 0.92 |
| ZnO-B$_2$O$_3$ | 51.5% | ZnO | 1.65 | 0.78 |
| CdO-B$_2$O$_3$ | 57% | CdO | 1.67 | 0.83 |
| CaO-B$_2$O$_3$ | 25% | CaO | 1.59 | 0.65 |
| SrO-B$_2$O$_3$ | 32% | SrO | 1.57 | 0.59 |
| BaO-B$_2$O$_3$ | 35% | BaO | 1.60 | 0.67 |
| PbO-B$_2$O$_3$ | 19.5% | PbO | 1.63 | 0.74 |

As between the binary silicate and borate systems shown above in Table I, the binary borate glasses are preferred because of the low viscosity demonstrated by the separated phase, which makes elongation of the phase very easy.

Choosing appropriate compositions in ternary and more complex composition systems is difficult since the locations of phase-separable composition regions vary from system to system and since the temperature dependence of immiscibility in these regions has in many cases not been accurately determined.

The rate of second phase separation and growth in phase-separable glass compositions varies considerably from composition to composition depending on a number of physical and chemical factors. In some systems, phase-separation may occur as the glass is continuously and rapidly cooled from the melt such that a hold in the phase-separation range is not required. In other systems, the glass must be maintained at phase separation temperatures for some period of time to obtain second phase precipitation and growth. In any case, for the purpose of inspection or convenience in production, the glass may be cooled to room temperature after melting or after any additional heat treatment in order to ascertain the nature and extent of second phase development.

The extent of development of the light-reflecting second phase must be controlled because insufficient second phase volume would result in the failure of the elongated material to channel light. Excessive second phase development, on the other hand, leads to attenuation of the light due to scattering of light rays by the second phase. For this reason, elongated second phase volumes ranging about 2-20% of the phase-separated glass are normally employed.

The elongation of the phase-separated glass may be accomplished by any of a variety of conventional redrawing means which are suited to the phase separation behavior and viscosity characteristics of the glass being worked. Glasses which are advantageously formed at higher temperatures and lower viscosities in the working range, e.g., $10^4 - 10^6$ poises, may be formed by hand-drawing from the melt or by flow techniques such as down-drawing through an orifice. Glass which must be treated at low temperatures and high viscosities, e.g., $10^6 - 10^{10}$ poises, may require elongation by stretching with redrawing apparatus utilizing traction devices or the like.

Although elongation of the glass to an extent at least sufficient to produce elongated second phase particles having an aspect ratio in excess of 5:1 may produce detectable light-channeling in the glass, substantially higher aspect ratios are preferred to maximize resolution and reduce scattering losses. Hence, whereas the fiber optic effect is readily observable when the separated particles have aspect ratios exceeding about 8:1 (theoretically obtained by elongating the glass by a factor of 4) the effect becomes good at aspect ratios of about 64:1 (corresponding to elongation by a factor 16) and excellent at aspect ratios approaching 1,000:1 (theoretically corresponding to elongation by a factor of 100). However, excessive elongation of the glass can produce discontinuities in the elongated second-phase particles which deleteriously affect performance. This is more likely to occur when the second phase particles are small prior to elongation; therefore, large second phase particles (about 0.1 to 1.0 microns in diameter) having thicknesses of at least 100A, after elongation, are preferred.

The theoretical aspect ratio of elongated particles is computed from the elongation factor using the relationship:

$$\text{aspect ratio} - (\text{elongation factor})^{3/2}$$

and this relationship is believed to closely describe elongation behavior in preferred phase-separable glass systems such as are described herein. However, the actual aspect ratio obtained in a given system is affected by the particle size of the separated phase and its viscosity relative to the viscosity of the matrix glass. These factors normally reduce observed aspect ratios below the values predicted by theory, and therefore care must be taken to insure that actual aspect ratios, as determined by inspection of the elongated glass, meet the limitations for fiber optic behavior hereinabove described.

Differences in particle size, location, composition and/or temperature may also result in the presence in the glass of some particles having aspect ratios below those of the major proportion of the separated phase. The invention includes glasses containing minor amounts of such particles provided the proportion of second-phase particles present which do meet the specified aspect ratio requirements is sufficient in volume (at least about 2%) to produce the light-channeling effect desired.

The following examples illustrate in greater detail the manufacture and use of pseudo-fiber optic devices according to the invention.

EXAMPLE I

A batch for a glass consisting essentially, in weight percent on the oxide basis as calculated from the batch, of about 70.5% SiO$_2$, 13.0% B$_2$O$_3$, 3.0% Na$_2$O, 6.0% BaO, 5.0% CaO, 1.5% Al$_2$O$_3$ and 1.0% P$_2$O$_5$ is compounded and melted in a platinum crucible for 4 hours at 1,550° C. to form a stable single-phase liquid.

Thereafter the melt is cooled over an interval of about 3 hours to 980° C. at which temperature a two-phase melt is observed. The separation of a discontinuous particulate second phase from the original liquid appears to initiate when the melt temperature drops below about 1,400° C. and is essentially completed as the melt temperature reaches 980° C. The separated phase comprises about 5% by volume of the melt and has an index of refraction of about 1.46 as compared with about 1.6 for the matrix glass.

Thereafter, the melt is severely elongated by downdrawing through a hole in the crucible bottom to form rods about one-eighth inches in diameter from the melt. By this process, an elongation factor of about 40 is realized, resulting in the elongation of the particulate second phase droplets to an aspect ratio of about 250.

Figure 3:
FIG. 3 is an electron photomicrograph of a longitudinal cross-section of a pseudo-fiber optic device according to the invention clearly showing the needle-like configuration of the separated phase which is effective to channel light through the material.
Figure 4:
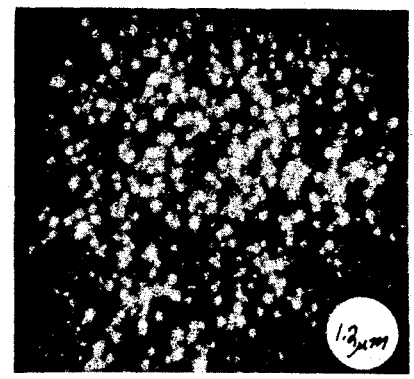
FIG. 4 is an electron photomicrograph of a transverse cross-section of a pseudo-fiber optic device according to the invention showing an end view of the matrix and separated phase.

The rods produced by the described process are annealed at 600° C. and then examined for optical behavior. It is found that they demonstrate pronounced fiber optic properties, transmitting resolved coherent images for distances well in excess of 1 foot. Small radius right angle bends in these pseudo-fiber optic rods do not substantially degrade image transmission characteristics. The rods may be tapered using standard lampworking techniques to produce contact magnifier and demagnifiers. The microstructure of pseudo-fiber optic rods produced as described is shown in FIG. 3 and 4 of the drawing, which are electron photomicrographs of the horizontal and longitudinal fracture surfaces respectively of the phase-separated elongated glass. The separated light-reflecting phase appears as white spots in the darker background of the continuous glass matrix in the horizontal fracture surface of FIG. 4, magnified 10,500 times, whereas the longitudinal fracture surface of FIG. 3, magnified 3,150 times, shows the light-reflecting phase as a multiplicity of white streaks.

The foregoing example represents a presently preferred embodiment of the present invention.

EXAMPLE II

A batch for a glass consisting essentially, in weight percent on the oxide basis as calculated from the batch, of about 58.75% $B_2O_3$, 41.25% PbO, and 0.5% $Al_2O_3$ is compounded and melted in a platinum crucible at 1,000° C. for four hours. The melt is a stable single-phase liquid at melting temperatures.

The melt is thereafter cast into 1 inch × 1 inch bars and one-half inch × 4 inch slabs, in which a minor second phase consisting of low refractive index, $B_2O_3$-rich droplets forms spontaneously on cooling.

Some of the phase-separated glass bars and slabs are thereafter heat treated at 525° C. for 36 hours or at 600° C. for 2 hours to increase the volume of the second phase by growing the precipitated droplets to larger sizes.

Some of the cast slabs, both heat treated and untreated, are then clamped and placed in a horizontal redrawing furnace. After heating to 500° C., corresponding to a glass viscosity of about $10^7$ poises, a tensile force is applied to the glass through the clamps with chains actuated and controlled by a hydraulic cylinder to obtain the desired degree of elongation. After stretching, the furnace is opened and the glass rapidly cooled to immobilize the elongated second phase particles.

In another elongation method, both heat treated and untreated cast bars are suspended vertically from a fixed support and an electric heater is placed around each bar about half way down its length. A friction-type traction device is then attached to the lower end of each bar. The glass within the region of the heater is then brought to a temperature in the range of about 475°–525° C., corresponding to a glass viscosity near $10^7$ poises, and the glass is then elongated with the traction device. The elongated glass cools as it is drawn from the heater.

Elongation of the glass bars and slabs according to both of the above procedures by factors ranging from 16 up to about 64 result in the production of excellent fiber optic behavior in the elongated material. In general, both heat treatment and increased elongation appear beneficial to fiber optic properties in both the bars and the slabs.

A number of sections of the more severely elongated glass bars which were not heat treated, being about one-eighth inch × one-eight inch in cross-section and one-half inch in length, are bonded together and polished to form a pseudo-fiber optic plate about one-half inch in thickness. The plate transmits a clear image of a printed page.

The $PbO$—$B_2O_3$ phase-separable composition described may also be usefully formed into pesudo-fiber optic devices by drawing directly from a crucible melt to form rods. The drawing rate may be varied to produce tapered rods showing low power image magnification and demagnification.

It is readily apparent from the foregoing description and examples that numerous variations and modifications in the procedures and devices described herein may be undertaken within the scope of the present invention. The principles set forth are quite general and could be extended to non-oxide glass systems such as the halide and chalcogenide glasses. Phase separation in the glass-forming LiF—BeF and As—S systems is well documented, and pseudo-fiber optic devices could conceivably be fabricated in these or other systems having the glass-forming and phase-separation characteristics herein described.

We claim:

1. A pseudo-fiber optic device consisting of a phase-separated glass article comprising a continuous glass light-transmitting phase in the form of a matrix and an internal discontinuous light-reflecting phase in the form of elongated particles uniformly dispersed throughout the matrix, oriented essentially parallel with respect to one another in the direction of elongation, said particles having an index of refraction less than that of the glass light-transmitting phase and aspect ratios of at least about 5:1.

2. A pseudo-fiber optic device according to claim 1 wherein the elongated particles have aspect ratios of at least about 8:1 and comprise about 2–20% by volume of the glass.

3. A pseudo-fiber optic device according to claim 2 wherein the elongated particles have aspect ratios of at least about 64:1 and thicknesses of at least about 100A.

4. A process for transmitting an optical image which comprises trapping light entering a phase-separated glass body within a defined angle of entry $\theta$;

a. said phase-separated body comprising a continuous glass light-transmitting phase in the form of a matrix and a discontinuous light-reflecting phase in the form of elongated particles of lower refractive index than the matrix, said particles
  i. being oriented essentially parallel to one another in the direction of elongation;
  ii. being uniformly dispersed throughout the glass light-transmitting phase; and
  iii. having aspect ratios of at least about 5:1; and b. said angle of entry $\theta$, being the angle between the direction of entry of the light and the direction of elongation of the particles, having approximately the value defined by the equation $$\sin \theta = n_1/n_o \sqrt{1 - [n_2/n_1]^2}$$

wherein $n_o$ is the refractive index of the medium surrounding the body, $n_1$ is the refractive index of the light-transmitting phase and $n_2$ is the refractive index of the light-reflecting phase; such that the light is transmitted through the phase-separated glass body by successive reflections from the discontinuous light-reflecting phase and emitted therefrom at essentially the same angle with respect to the direction of elongation of the light-reflecting phase as it entered.

5. A process according to claim 4 wherein said elongated particles have aspect ratios of at least about 8:1 and comprise about 2-20% by volume of the glass.

6. A process according to claim 5 wherein said elongated particles have aspect ratios of at least about 64:1 and thicknesses of at least about 100A.

* * * * *